(12) United States Patent
Kanayama et al.

(10) Patent No.: US 6,367,700 B1
(45) Date of Patent: Apr. 9, 2002

(54) IC CARD READER

(75) Inventors: Yasuhiro Kanayama; Hajime Oki, both of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/521,080

(22) Filed: Mar. 7, 2000

(30) Foreign Application Priority Data

Mar. 8, 1999 (JP) .......................................... 11-060067

(51) Int. Cl.[7] ............................................... G06K 13/00
(52) U.S. Cl. ........................ 235/475; 235/453; 235/493; 235/441; 235/449
(58) Field of Search ................................ 235/441, 449, 235/475, 492, 493

(56) References Cited

U.S. PATENT DOCUMENTS

| | | | | |
|---|---|---|---|---|
| 5,061,842 A | * | 10/1991 | Payne | 235/449 |
| 5,196,687 A | * | 3/1993 | Sugino et al. | 234/441 |
| 5,331,138 A | * | 7/1994 | Saroya | 235/449 |
| 6,138,916 A | * | 10/2000 | Zolkos et al. | 235/475 |

FOREIGN PATENT DOCUMENTS

JP   02000137770 A   *   5/2000

\* cited by examiner

*Primary Examiner*—Michael G. Lee
*Assistant Examiner*—Daniel Walsh
(74) *Attorney, Agent, or Firm*—Pearne & Gordon LLP

(57) ABSTRACT

An IC card reader comprising a lock lever and a lock lever driving member. The lock lever prevents a card from being drawn out. The lock lever driving member drives the lock lever diagonally distant from a card in an unlocking operation, and drives the lock lever adjacent to the card in a locking operation.

Preferably, the IC card reader further comprises a restricting portion restricting the movement of the lock lever in an unlocking direction during locking.

7 Claims, 5 Drawing Sheets

L2 > L1

IC CARD READER

BACKGROUND OF THE INVENTION

1. Field of the Invention

The present invention relates to an IC card reader into which an IC card or a magnetic card is loaded and which records information on such a card and reads the information therefrom.

2. Description of the Related Art

In recent years, the fields of application of IC cards and magnetic cards have come to expand, and in conjunction with this trend, the number of those who insert short cards (hereafter referred to as half cards) other than standard cards, paper scraps, coins, and the like into IC card readers for the purpose of tampering has increased, which constitute causes of the failure of the IC card readers.

As shown in FIG. 8, the conventional IC card reader is comprised of a card inserting portion 16 into which a card 15 is inserted; a slider 17 which moves in interlocking relation to the card 15 upon insertion of the card 15; an ejection spring 18 for urging the card in its ejecting direction; a latch lever 19 adapted to be rotated about a predetermined point 20 and to stop the slider 17 in a state in which the card 15 is inserted up to a reading position; a latch spring 22 for rotating a retaining portion 25 of the latch lever 19 toward a retaining portion 21 of the slider 17; a solenoid 23 for canceling the stopped state of the slider 17; and a lock lever 24 for locking a rear end of the card 15 at a distal end of the slider 17.

However, with the above-described conventional IC card reader which has a card locking mechanism occupying a large area on the lower surface side of an IC contact, a large opening for allowing a half card, a coin, or the like to drop therethrough cannot be provided on the lower surface side of the IC contact.

In addition, if the above-described card locking mechanism portion is mounted on the IC contact side, since the card locking mechanism portion interferes with the IC contact 26 as shown in FIG. 8 and electrical components on a printed circuit board, the card locking mechanism becomes complex.

In addition, with the locking mechanism which locks by the use of mechanical components alone, since the card can be loaded into the IC card reader even during a power failure, and the card reader is locked, the card cannot be removed until the power failure is remedied.

SUMMARY OF THE INVENTION

The present invention has been devised to overcome the above-described problems, and its object is to provide an IC card reader having a large opening for allowing a half card or a coin to drop therethrough on the lower surface side of the IC contact, by devising a card locking mechanism in which the lock lever is electrically driven and which has a structure allowing the card locking mechanism to be mounted on the IC contact side.

To attain the above object, a first IC card reader in accordance with the present invention comprises: a lock lever for preventing a card from being drawn out; and a lock lever driving member for driving the lock lever, wherein the lock lever driving member drives the lock lever in a diagonally upward or downward direction with respect to a traveling direction of the card so as to effect a locking operation and an unlocking operation.

In addition, a second IC card reader in accordance with the present invention comprises: a lock lever for preventing a card from being drawn out; and a lock lever driving member for driving the lock lever, wherein the lock lever driving member rotates the lock lever in a traveling direction of the card.

In addition, a third IC card reader in accordance with the present invention comprises: a lock lever for preventing a card from being drawn out; a lock lever driving member for driving the lock lever; and a rotatively driving member for imparting a rotating force to the lock lever driving member, wherein the lock lever driving member has a converting portion for operating the lock lever in a substantially parallel direction upon receiving the rotating force from the rotatively driving member.

In addition, a fourth IC card reader in accordance with the present invention further comprises: a restricting portion for restricting the movement in an unlocking direction at the time of locking.

DETAILED DESCRIPTION OF THE PREFERRED EMBODIMENTS

Figure 1A:
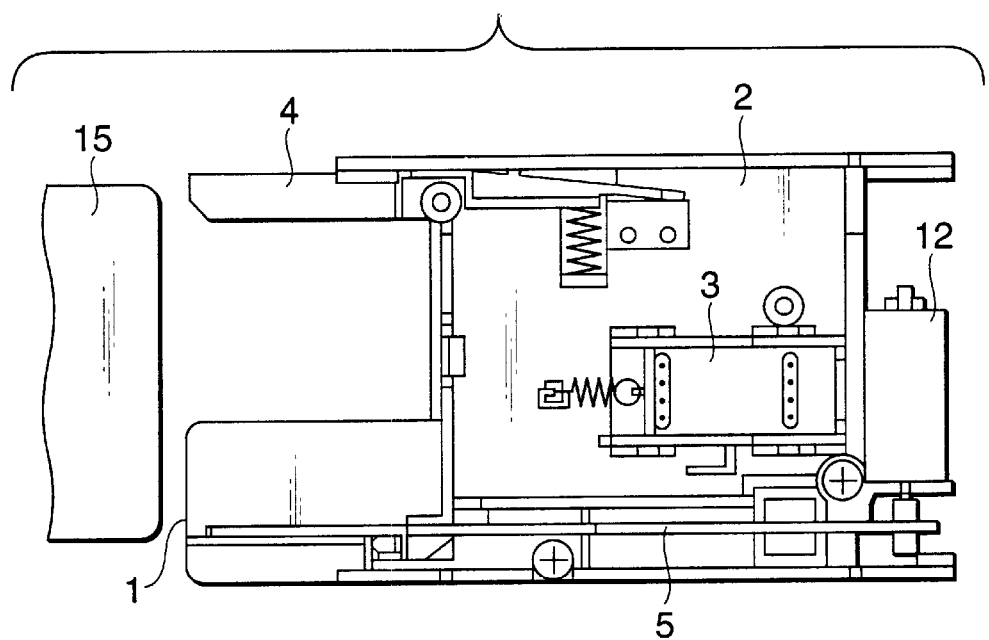
FIG. 1A is a plan view illustrating an IC card reader in accordance with a first embodiment of the present invention.

By virtue of the above-described arrangements, in accordance with the first and second IC card readers of the present invention, the lock lever for preventing a draw of the card inserted in the IC card reader, a crank serving as the lock lever driving member for driving the lock lever, and a motor serving as the rotatively driving member for rotating the crank in the traveling direction of the card are provided in a rear portion of the IC card reader. Consequently, the lock lever is capable of reliably locking the card from a diagonally upward direction with respect to the traveling direction of the card. Hence, it is possible to configure a compact card locking mechanism.

In addition, the third IC card reader comprises a lock lever for preventing the drawing out of the card, a crank for driving the lock lever, and a motor for imparting a rotating force to the crank, wherein an arcuate guide groove is provided in a distal end portion of a housing so as to operate the lock lever in a substantially parallel direction by means of the crank upon receiving the rotating force from the motor. The provided structure is such that a pin press-fitted in a substantially longitudinally central portion of the lock lever is rotated in the guide groove in the housing in synchronism with the rotation of the crank, so that the locking and unlocking operation can be effected smoothly.

In addition, the fourth IC card reader in accordance with the invention is structured such that the locking position of the center of the crank pin connected to the lock lever is rotated further downward in such a manner as to be lower than the heightwise position of the center of the motor shaft so as to retain the lock lever. Accordingly, even if an attempt is made to forcibly pull out the card, the lock is not canceled, and the card can be held positively.

First Embodiment

Referring now to the drawings, a detailed description will be given of an embodiment of the invention.

It should be noted that although a description will be given hereafter by using an IC card reader, the invention should not be limited to the IC card reader, and it goes without saying that the invention is also applicable to a magnetic card reader and other types of card readers.

Figure 1B:
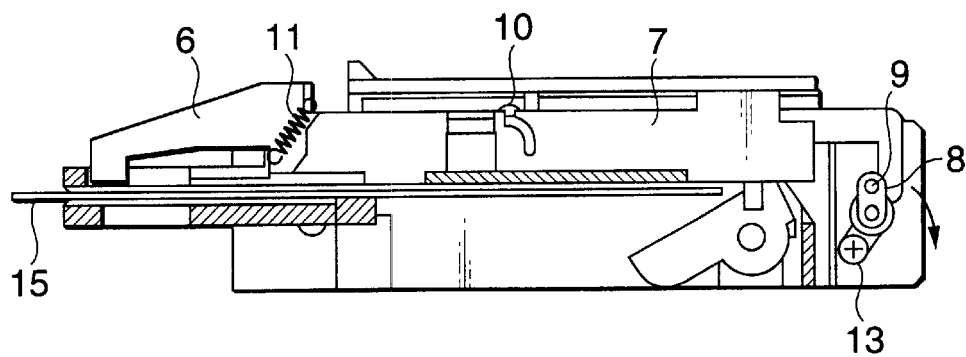
FIG. 1B is a diagram illustrating an unlocked state of the card locking portion of the IC card reader.
Figure 1C:
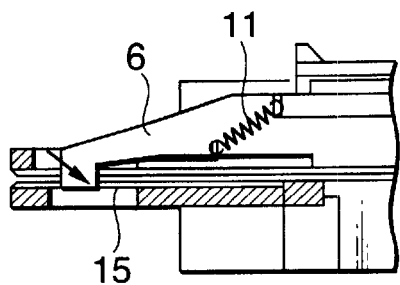
FIG. 1C is a diagram illustrating a locked state of the card locking portion of the IC card reader.
Figure 2:
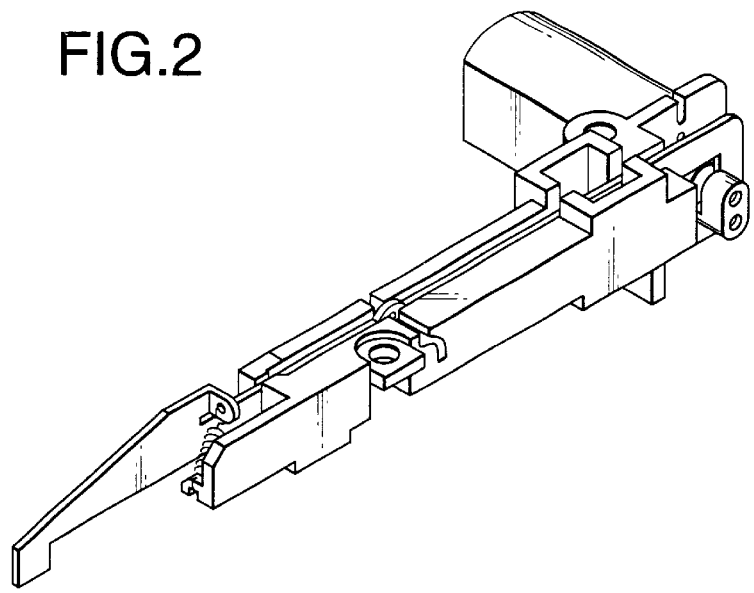
FIG. 2 is a perspective assembled view of the card locking portion of the IC card reader.
Figure 3:
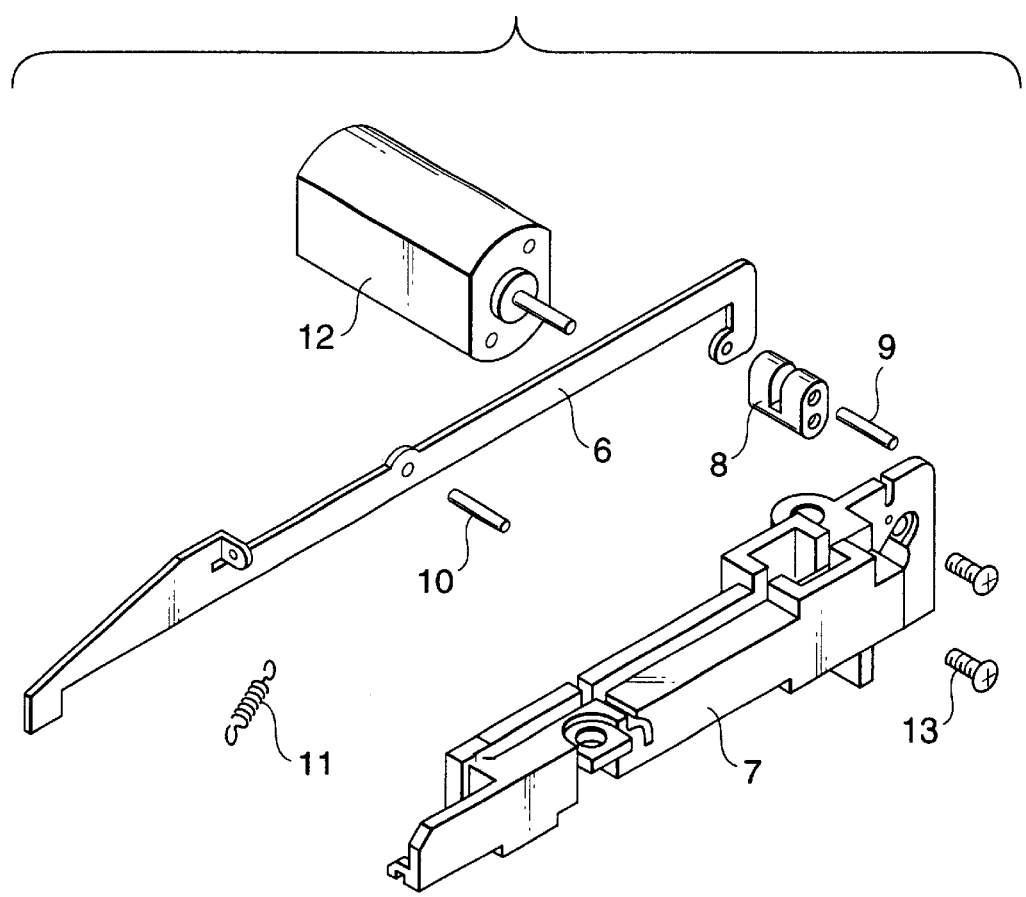
FIG. 3 is an exploded perspective view of the card locking portion of the IC card reader.
Figure 4A:
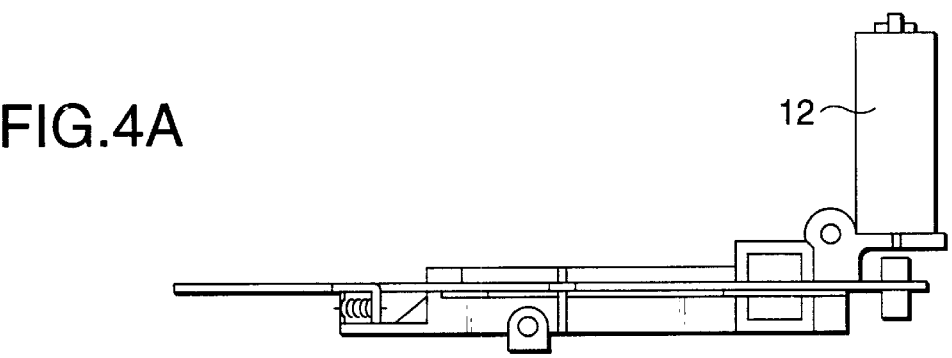
FIG. 4A is a plan view of the card locking portion of the IC card reader in accordance with second and third embodiments of the present invention.
Figure 4B:
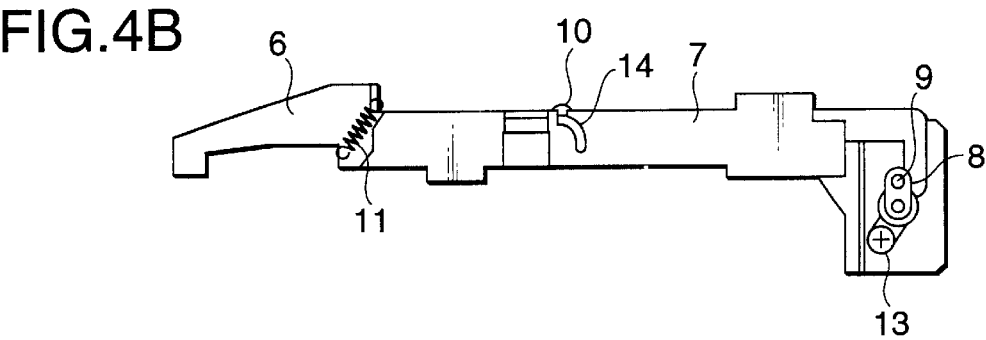
FIG. 4B is a front elevational view of the card locking portion of the IC card reader shown in FIG. 4A.
Figure 5A:
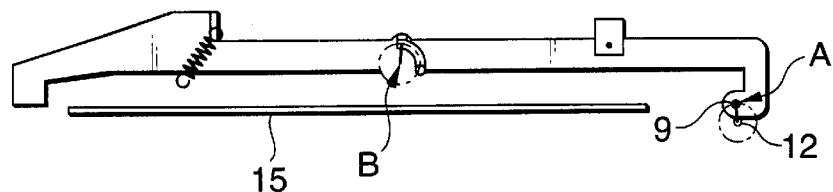
FIG. 5A is a diagram explaining the driving of a lock lever of the IC card reader (in the unlocked state) in accordance with the second embodiment of the present invention.
Figure 5B:
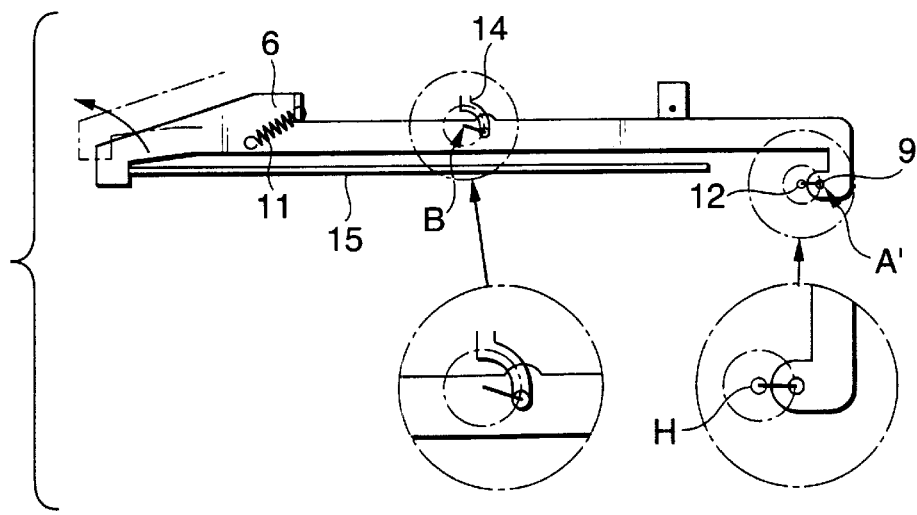
FIG. 5B is a diagram explaining the driving of the lock lever of the IC card reader (in the locked state)
Figure 6:
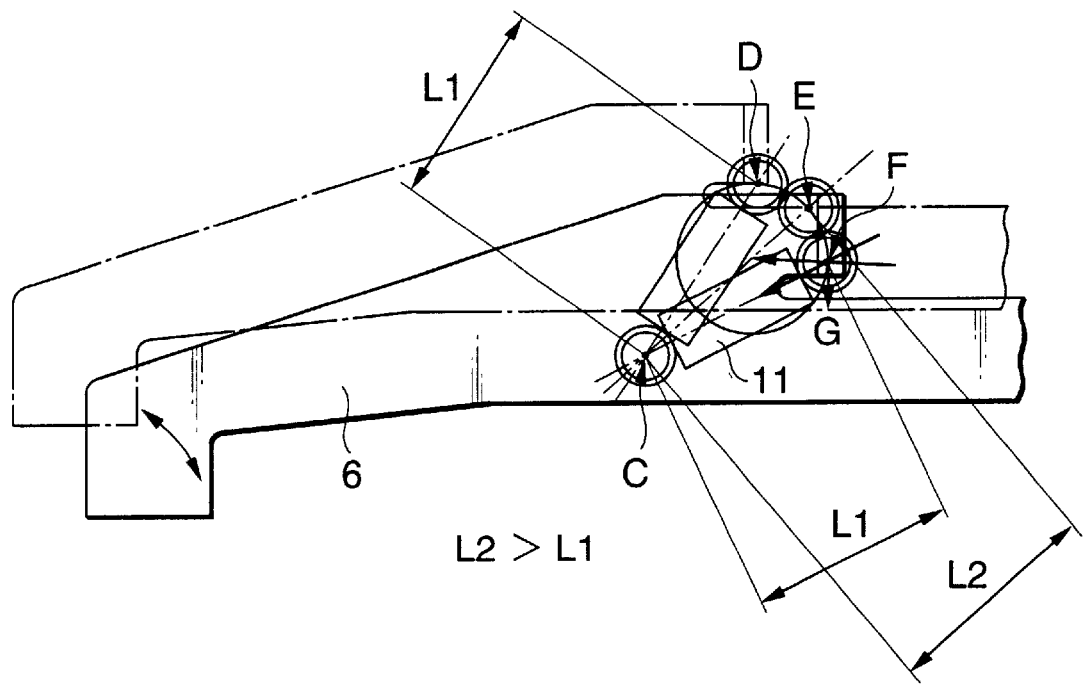
FIG. 6 is a diagram explaining the operation of a spring for maintaining the state of the lock lever of the IC card reader.
Figure 7:
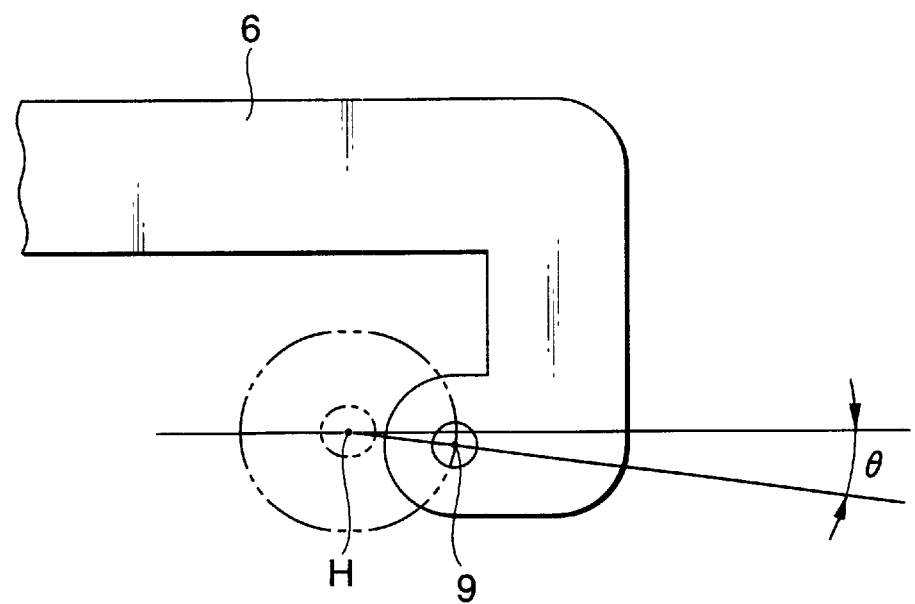
FIG. 7 is a diagram explaining a mechanism for restricting the unlocking of the IC card reader in accordance a fourth embodiment of the present invention.
Figure 8:
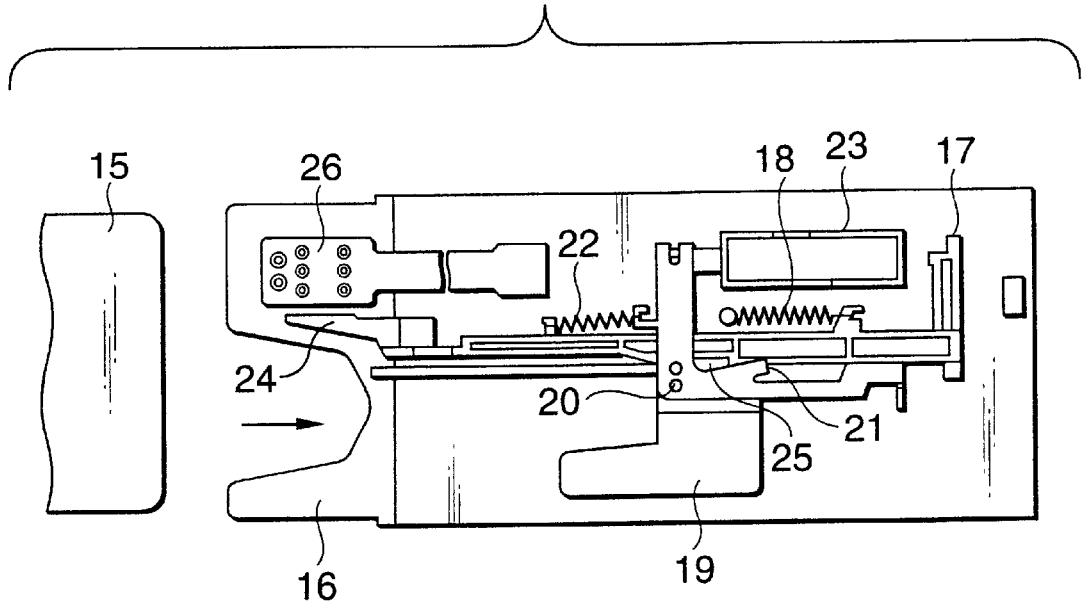
FIG. 8 is a plan view of a conventional IC card reader.
Figure 9:
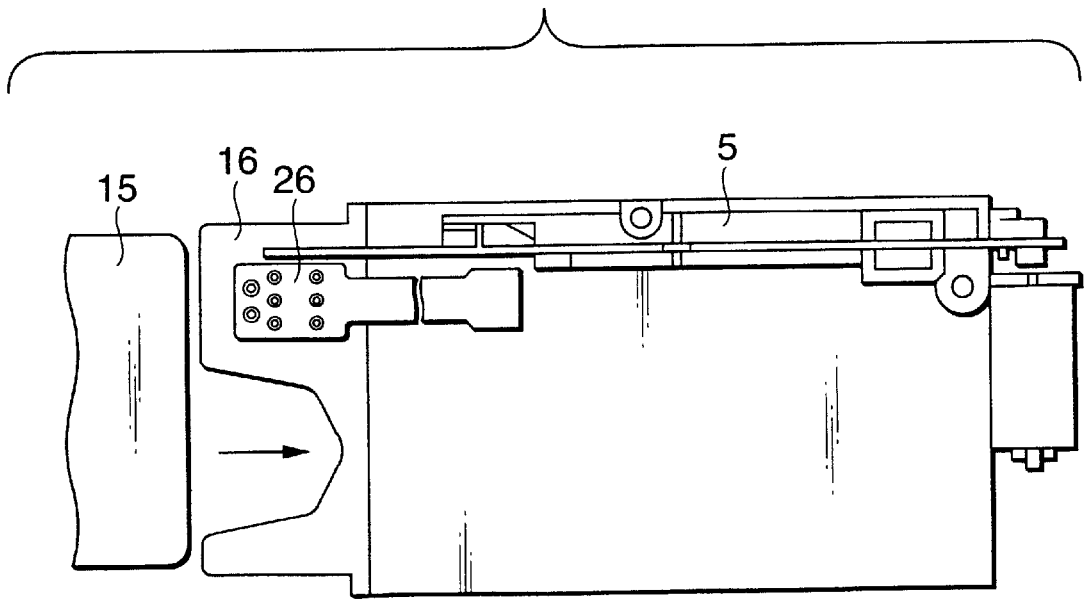
FIG. 9 is a plan view in which the card locking mechanism in accordance with the fourth embodiment of the invention is incorporated in the conventional IC card reader.

FIG. 1A is a plan view illustrating an IC card reader in accordance with an embodiment of the present invention; FIG. 1B is a diagram illustrating an unlocked state of the card locking portion shown in FIG. 1A; FIG. 1C is a diagram illustrating a state of card locking; FIG. 2 is a perspective assembled view of the card locking portion of the IC card reader; FIG. 3 is an exploded perspective view of the card locking portion of the IC card reader; FIG. 4A is a plan view of the card locking portion of the IC card reader; FIG. 4B is a front elevational view of the card locking portion of the IC card reader; FIG. 5A is a diagram explaining the driving of a lock lever of the IC card reader (in the unlocked state); FIG. 5B is a diagram explaining the driving of the lock lever of the IC card reader (in the locked state); FIG. 6 is a diagram explaining the operation of a spring for maintaining the state of the lock lever of the IC card reader; FIG. 7 is a diagram explaining a mechanism for restricting the unlocking of the IC card reader; FIG. 8 is a plan view of a conventional card reader; and FIG. 9 is a plan view in which the card locking mechanism in accordance with the present invention is incorporated in the conventional card reader.

In the IC card reader shown in FIGS. 1A to 1C, a card inserting portion 1, a card reader body portion 2, an IC contact portion 3, and a card guide portion 4 are similar to those of the conventional IC card reader, but as its embodiment the IC card reader is provided with a card locking mechanism portion 5 (a lock lever 6, a housing 7, a crank 8, a crank pin 9, a lock lever pin 10, a lock lever spring 11, a motor 12, and motor attaching screws 13).

In the above-described arrangement, a space (card guide passage) into which the card is inserted is formed in the card reader body portion 2. To give a description of the operation in the above-described arrangement, a card 15 is inserted into the card inserting portion 1 of the card reader and further into the card guide passage which guides the card 15 to the interior of the card rear body portion 2. When the card 15 is inserted into the interior of the card guide passage of the card reader body portion 2 up to the position where reading and writing of information are effected by the IC contact portion 3, a sensor (not shown) mounted at the IC contact portion is operated to operate the motor 12. The crank 8 fixed to a motor shaft also rotates, and the lock lever 6 connected to the crank 8 moves diagonally downward to lock the card 15. In addition, after the card 15 being thus held is subjected to information processing such as reading and writing, in response to a card unlocking command signal the motor 12 generates a driving force in the direction opposite to the direction during locking, which in turn causes the lock lever 6 to move diagonally upward to unlock the card 15.

It should be noted that if the card locking mechanism portion 5 shown in FIGS. 1A to 1C is taken out, it is shown in FIG. 2. Further, FIG. 3 is an exploded view of the component parts of the card locking mechanism portion 5.

Second Embodiment

Hereafter, a description will be given of a second embodiment of the present invention with reference to FIGS. 4 and 5.

This embodiment is similar to the embodiment shown in FIGS. 1A to 1C in that the IC card reader is comprised of the card inserting portion 1, the card reader body portion 2, the IC contact portion 3, the card guide portion 4, and the card locking mechanism portion 5 (the lock lever 6, the housing 7, the crank 8, the crank pin 9, the lock lever pin 10, the lock lever spring 11, the motor 12, and the motor attaching screws 13).

To give a description of the operation of the card locking mechanism portion 5 in the above-described arrangement, FIGS. 4A to 4B show the lock lever 6 in an unlocked state. Further, the positional relationship between the lock lever 6 and the crank 8 of the card locking mechanism portion 5 is shown in FIGS. 5A and 5B. FIG. 5A is a diagram illustrating the unlocked state. In this unlocked state, the crank pin 9 at the distal end of the crank 8 fixed to the motor 12 is at a position A where the lock lever 6 has been pushed up, and since the lock lever spring 11 urges the lock lever 6 counterclockwise at a first bottom dead point (point D), the lock lever 6 is held at a position where it has been moved to the upper side from the card traveling surface (see FIG. 6). Meanwhile, to lock the card, the motor 12 and the crank 8 rotate clockwise to rotate the lock lever 6 downward, whereby the distal end of the lock lever 6 is lowered to a position slightly below the card traveling surface, so that the card can be locked. At this time, the crank pin 9 is at a position A'.

In addition, as shown in FIG. 6, when the lock lever 6 rotates, the lock lever spring 11 passes a top dead point (point E) of the spring and moves to a second bottom dead point (point F). At this time, since the lock lever spring 11 also urges the lock lever 6 downward (in the G direction), the lock lever 6 becomes stabilized at the position after its movement. Here, a supplementary description will be given of the operation of the lock lever spring 11. The center of a guide groove 14 for rotation and the point C of the center of rotation of the spring are set such that the length (L2) of the lock lever spring 11 at its top dead point (point E) becomes longer than the length L1 thereof at its bottom dead points (points D and F) in both directions. Then, after passing the top dead point (point E), the lock lever spring 11 moves naturally to the bottom dead point side where the tensile force is weaker.

For this reason, the spring which has once dropped to the bottom dead point does not move to the opposite-side position by passing the top dead point unless it receives an external force greater than the spring force generated at the length of L2.

Third Embodiment

The arrangement of a third embodiment of the invention is similar to those of the first and second embodiments. In the above-described arrangement, the lock lever pin 10 is press-fitted in a substantially longitudinally central portion of the lock lever 6, and the guide groove 14, for rotation having an arcuate shape providing the same radius of rotation B as that of the crank shown in FIG. 5B is formed in a corresponding portion of the housing 7, such that the lock lever pin 10 comes to be located at the end of the guide groove 14 on the distal end side of the lock lever 6 after the rotation of the rear end of the lock lever 6 by the rotation of the crank 8. The lock lever pin 10 is inserted in the guide groove 14, and by synchronizing the rotary motion of the crank pin 9 and the lock lever pin 10, a swinging motion capable of moving in a direction substantially parallel to the card traveling direction can be produced in the lock lever 6.

Fourth Embodiment

The arrangement of a fourth embodiment of the present invention is similar to those of the above-described first to third embodiments. In the above-described arrangement, if the position of the center of the crank pin 9 at the rear end of the lock lever 6 in the locked state is higher than the center H of a motor shaft, the retaining force of the card lock is constituted only by the spring force using the crank. For this reason, if an attempt is made to pull out the card 15 forcibly or by mistake by a manual operation from the direction of the card inserting portion 1, there are cases where the card reader can be easily unlocked. Accordingly, as shown in FIG. 7, a structure is provided such that the center of the crank pin 9 in its locking position is rotated further downward (by θ degrees) so as to be lower than the heightwise position of the center H of the motor shaft, so that the lock will not be easily canceled. In this case, if an attempt is made to pull out the card, the crank 8 acts to rotate clockwise (in the locking direction), so that unlocking becomes difficult.

It should be noted that FIG. 9 is a plan view in which the card locking mechanism portion 5 in accordance with the embodiment of the present invention is mounted on a conventional IC card reader, and the structure is such that the card locking mechanism portion 5 does not take up much space inside the card reader as compared with a conventional card locking mechanism (see FIG. 8).

As is apparent from the foregoing description, in the first or second IC card reader, since the lock lever is driven in a diagonally upward or downward direction with respect to the traveling direction of the card so as to effect the locking operation and the unlocking operation, the locking and unlocking operation of the card can be effected smoothly.

In addition, since the card locking mechanism portion of the present invention is of such a structure that it does not take up much space, the card locking mechanism portion can be mounted on the IC contact side, so that an opening for allowing a half card or a coin to drop therethrough can be provided on the lower surface side of the IC contact.

In addition, the third IC card reader has a rotatively driving member for imparting a rotating force to the lock lever driving member, and the lock lever driving member has a converting portion for operating the lock lever in a substantially parallel direction upon receiving the rotating force from the rotatively driving member. Accordingly, reliable locking and unlocking operation can be effected with a light rotating torque.

In addition, since the rotatively driving source is an electrically operated component, the lock lever is prevented from being actuated during a power failure, so that even if the card is inserted by mistake, the card locking mechanism does not operate. Hence, it is possible to immediately remove the card from the IC card reader.

In addition, since the fourth IC card reader has a restricting portion for restricting the movement in the unlocking direction at the time of locking, the card cannot be easily drawn out. Hence, it is possible to prevent the interruption of reading and writing of information on the card as well as the destruction of information.

The present invention is based on Japanese Patent Application No. Hei. 11-60067 which is incorporated herein by reference.

What is claimed is:

1. An IC card reader comprising:
    a lock lever for preventing a card from being drawn out of said IC card reader, said lock lever located diagonally distant from the card in an unlocked position and adjacent to the card in a locked position; and
    a lock lever driving member for operating said lock lever from said unlocked position to said locked position; said driving member driving said lock lever to said locked position while maintaining said lock lever in a position parallel to said card in said locked position and in said unlocked position.

2. The IC card reader according to claim 1, further comprising a lock lever restricting portion restricting movement of said lock lever in an unlocking direction while in said locked position.

3. The IC card reader according to claim 1, further comprising a motor driven by a signal from a sensor detecting an insertion of the card, wherein said lock lever driving member includes a crank transmitting driving force from the motor to said lock lever.

4. The IC card reader according to claim 2, further comprising a motor driven by a signal from a sensor detecting an insertion of the card, wherein said lock lever driving member includes a crank transmitting driving force from the motor to said lock lever.

5. An IC card reader according to claim 3, wherein said lock lever is a one-piece lever connected directly to said crank and said crank is driven directly by said motor.

6. An IC card reader according to claim 4, wherein said lock lever is a one-piece lever connected directly to said crank and said crank is driven directly by said motor.

7. The IC card reader according to claim 4, further comprising a lock lever restricting portion whereby a connection of said crank to said lever is rotated further downward than the center position of the motor shaft in the heightwise position.

* * * * *

UNITED STATES PATENT AND TRADEMARK OFFICE
CERTIFICATE OF CORRECTION

PATENT NO. : 6,367,700 B1
DATED : April 9, 2002
INVENTOR(S) : Yasuhiro Kanayama and Hajime Oki It is certified that error appears in the above-identified patent and that said Letters Patent is hereby corrected as shown below:

<u>Title page, Item [54] and Column 1, line 1,</u>
Please delete "IC CARD READER", and insert therefor -- LOCKING IC CARD READER --.

Signed and Sealed this

Twenty-fourth Day of September, 2002

*Attest:*

*Attesting Officer*

JAMES E. ROGAN
*Director of the United States Patent and Trademark Office*